United States Patent [19]
Zelinski

[11] Patent Number: 5,921,876
[45] Date of Patent: Jul. 13, 1999

[54] PIVOTAL MOTOR MOUNT FOR TENSIONING A BELT DRIVE WITH A ONE-WAY RESTRAINT ALLOWING PIVOTAL MOVEMENT IN A TENSIONING DIRECTION AND PREVENTING MOVEMENT IN A SLACKENING DIRECTION

[75] Inventor: Elgin Zelinski, Winnipeg, Canada

[73] Assignee: CML Northern Blower Inc., Winnipeg, Canada

[21] Appl. No.: 08/863,132

[22] Filed: May 27, 1997

[51] Int. Cl.$^6$ ............................................. F16H 7/14
[52] U.S. Cl. .................. 474/114; 474/101; 188/67; 74/531; 248/665
[58] Field of Search ................................ 474/101, 113, 474/114; 248/664, 665, 666; 74/531; 188/67

[56] References Cited

U.S. PATENT DOCUMENTS

| | | | |
|---|---|---|---|
| 2,367,267 | 1/1945 | Dawson | 474/114 X |
| 2,601,431 | 6/1952 | Christie | 474/114 X |
| 3,893,730 | 7/1975 | Homier et al. | 74/531 X |
| 4,387,926 | 6/1983 | Van Eerden et al. | 74/531 X |
| 4,768,930 | 9/1988 | Grime et al. | 248/665 X |
| 4,865,289 | 9/1989 | Lawson | 474/114 X |
| 5,785,620 | 7/1998 | Beutel et al. | 474/101 X |

*Primary Examiner*—Charles A. Marmor
*Assistant Examiner*—Ankur Parekh
*Attorney, Agent, or Firm*—Adrian D. Baddison; Murray E. Thrift

[57] ABSTRACT

An apparatus for use with motor-driven assemblies is described. The motor-driven assembly comprises a motor, a pulley driven by the motor, a driven element and a belt drive connecting the pulley and the driven element. The apparatus comprises a motor base and a pivot base. The motor is arranged on the motor base such that, due to the positioning of its mass, the motor will pivot away from the drive element. However, pivoting in this direction is opposed by the belt drive. Thus, as the belt drive tension reduces, the motor will pivot away from the drive element, thereby tightening the belt. A one-way restraining means connecting the pivot base and the motor base prevents the motor from pivoting back toward the drive element, thereby keeping the belt drive taut and retaining drive design expectations.

1 Claim, 4 Drawing Sheets

PIVOTAL MOTOR MOUNT FOR TENSIONING A BELT DRIVE WITH A ONE-WAY RESTRAINT ALLOWING PIVOTAL MOVEMENT IN A TENSIONING DIRECTION AND PREVENTING MOVEMENT IN A SLACKENING DIRECTION

The present invention relates to an apparatus for use with motor-driven assemblies. More specifically, the present invention relates to a motorized assembly apparatus comprising a pivoting motor base for supporting a motor thereon arranged for keeping a belt drive taut.

BACKGROUND OF THE INVENTION

A common problem encountered with drive elements driven by a motorized pulley and belt arrangement is that, over time, the belt drive stretches. As the maintenance of the belt tension (or tautness) is of prime importance, anything that permits the belt(s) to slacken produces a wide range of detrimental problems, such as, for example, noise, vibration, excessive belt wear and reduction in bearing life. The end result is that, eventually, the entire apparatus must be shut down for maintenance. A known solution is to arrange the motor to pivot so that as the belt drive slackens, the motor pivots away from the drive element, thereby tightening the belt(s). Thus, pivoting of the motor away from the driven element is resisted by the belt(s). However, the motor is not prevented from pivoting towards the driven element. This may result in the motor assembly bouncing due to the alternating relaxing and tightening of the belt drive acting between the pulleys. As a consequence, there is considerable risk that the motor will pivot toward the drive element during operation, thereby causing problems.

SUMMARY OF THE INVENTION

It is one object of the invention, therefore, to provide an apparatus for use with motor-driven assemblies comprising a motor base arranged to pivot in one direction for tightening a belt drive.

According to the invention, there is provided a motorized assembly apparatus comprising:

a driven element;

a motor for driving a pulley;

a belt drive connecting the pulley and the driven element;

a motor base for supporting the motor thereon;

a pivot base arranged for supporting pivoting motion of the motor base thereon such that the motor base pivots in a tensioning direction and a slackening direction, wherein the belt drive and the motor are arranged such that pivoting of the motor base in the slackening direction loosens the belt drive around the pulley and pivoting of the motor base in the tensioning direction tightens the belt around the pulley;

pivot biasing means for promoting pivoting of the motor base in the tensioning direction such that as the belt drive loosens, the motor pivots in the tensioning direction; and one-way restraining means connecting the motor base and the pivot base such that the one-way restraining means prevents the motor base from pivoting in the slackening direction.

Thus, as the belt drive slackens, the motor will pivot away from the driven element, thereby tightening the belt drive. Furthermore, the one-way restraining means prevents the motor from pivoting towards the driven element, thereby preventing bouncing of the motor assembly.

Preferably, the one-way restraining means comprises:

a way member;

a housing arranged to move along the way member in a first direction and a second direction;

at least one locking plate(s) within the housing for frictionally engaging the way member at an angle such that the housing can only move along the shaft in the first direction;

first attachment means for connecting the one-way restraining means to the pivot base; and second attachment means for connecting the one-way restraining means to the motor base.

The one-way restraining means may include release means for allowing pivoting in the second direction. The release means may comprise a mechanism for disengaging the locking plate(s) from the way member such that the housing moves along the way member in the second direction. Thus, the release means allows the motor base to be pivoted in the slackening direction so that the belt(s) can be replaced or serviced.

There may be one or more one-way restraining means attached to the motor base at positions proximal to either end of one side of the motor base.

The locking plate(s) may engage the way member at any position along the way member. As a result, the housing will move along the way member in the first direction in response to any pivoting in the tightening direction, no matter how slight.

Preferably, the motor has weight and the pivot biasing means comprises the weight of the motor. Alternatively, the pivot biasing means may comprise a plurality of springs or other forces arranged to pull the motor base in the tightening direction.

Thus, the motor is arranged on the motor base such that, due to the positioning of its mass, the motor will pivot away from the driven element. However, pivoting in this direction is opposed by the belt drive. Thus, as the belt drive loosens, the motor will pivot away from the driven element, thereby tightening the belt(s). The one-way restraining means prevents the motor from pivoting back, thereby reducing problems with the belt drive assembly.

DETAILED DESCRIPTION

Figure 1:
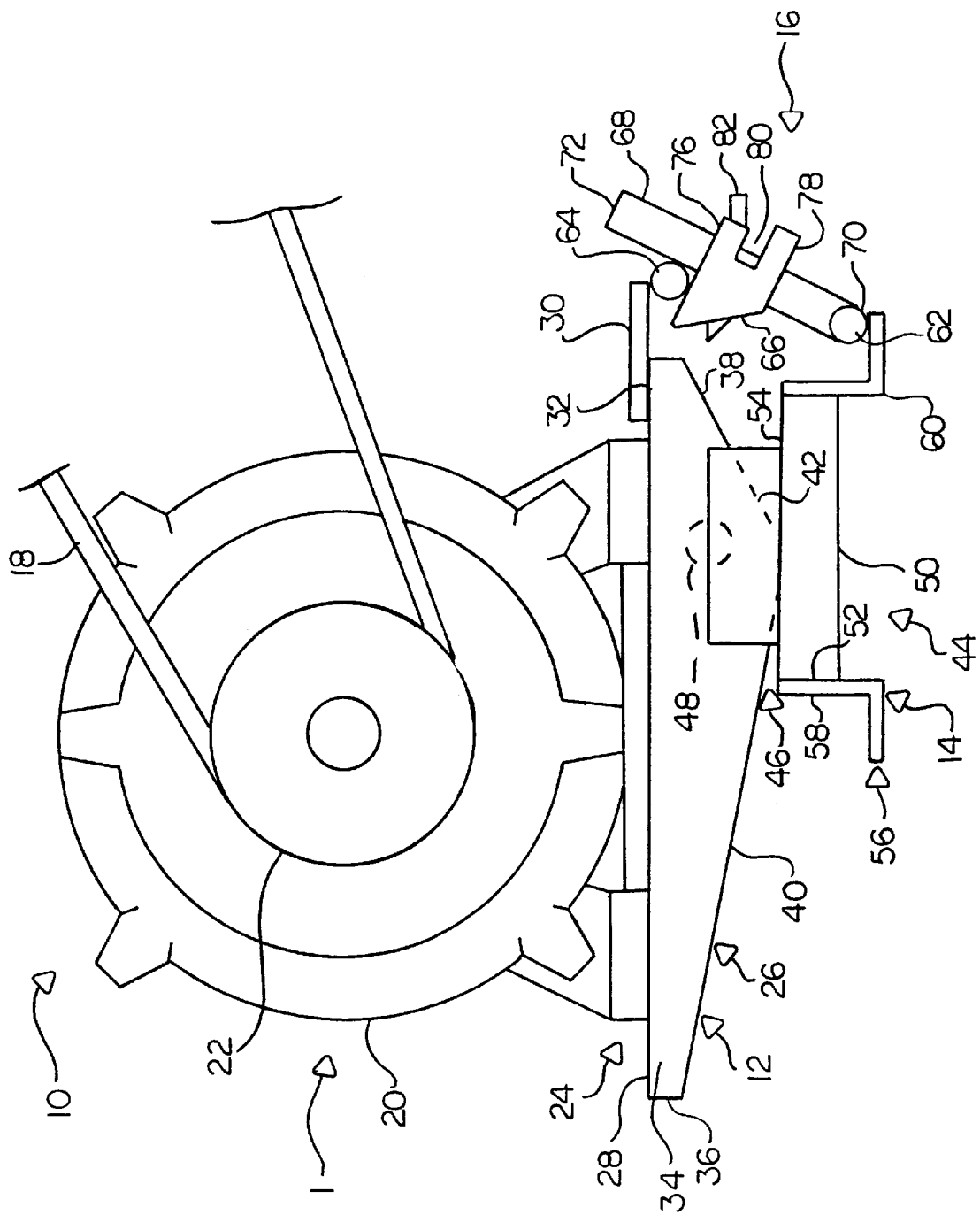
FIG. 1 is a front view of the apparatus.
Figure 2:
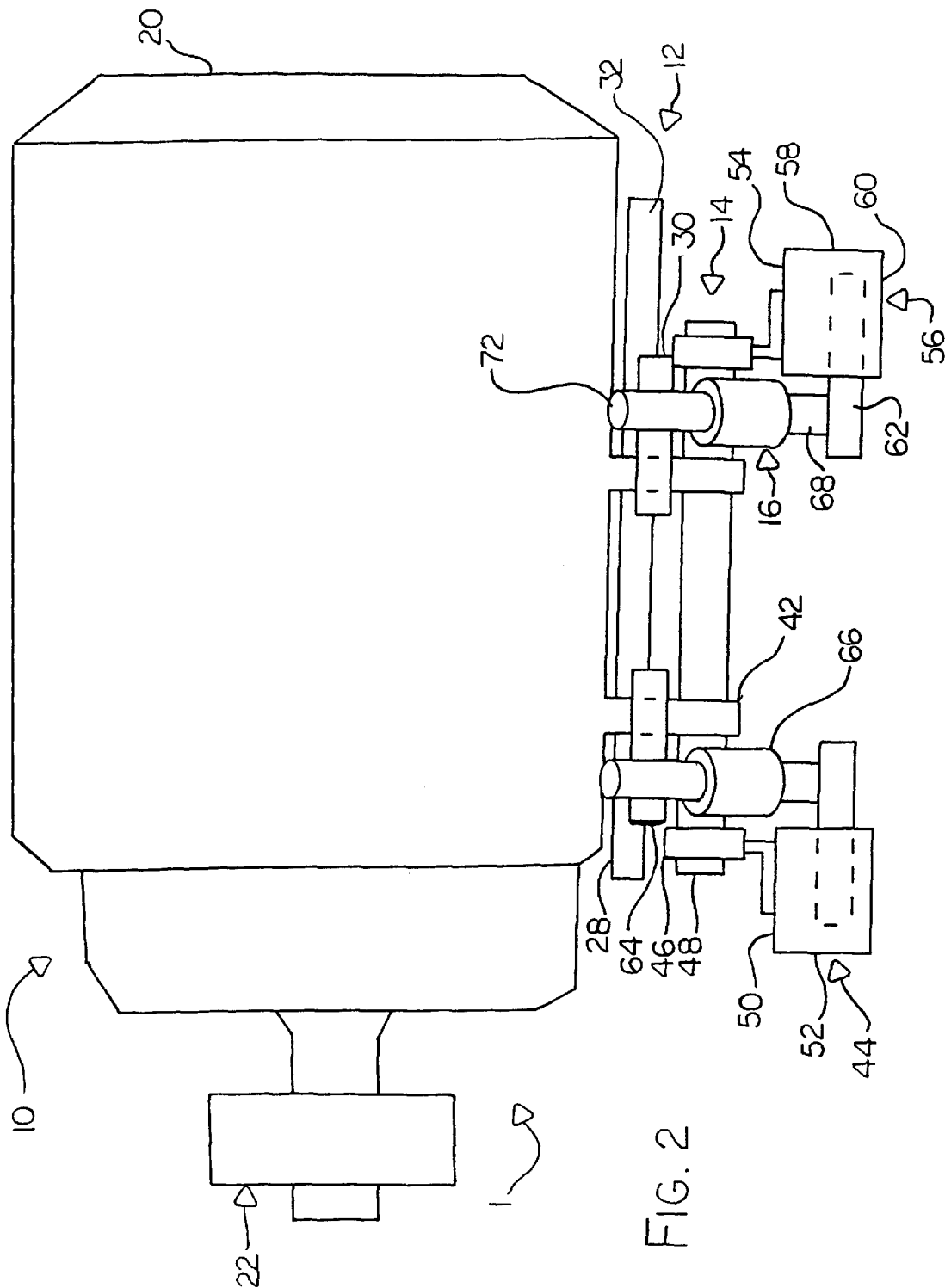
FIG. 2 is a side view of the apparatus.

In one embodiment, the motorized assembly apparatus 1 comprises a motor 10, a driven element, a motor base 12, a pivot base 14, and one-way restraining means 16, as shown in FIGS. 1 and 2.

The details of the driven element are not shown as these will be well known to one skilled in the art. The driven element includes belt(s) 18 arranged to drive the driven element as described below.

The details of the motor 10 are not shown as these will be well known to one skilled in the art. The motor 10 comprises a motor body 20 and a pulley 22. In operation, the motor body 20 is arranged to drive the pulley 22 in rotation about an axis.

The motor base 12 comprises an upper portion 24 and a lower portion 26. The upper portion 24 comprises a substantially planar surface 28 for supporting the motor body 20 thereon, as described below. The upper portion 24 includes two connecting members 30 extending laterally from a first side 32 of the motor base 12 at positions proximal to the respective ends of the first side 32. As described below, the motorized assembly apparatus 1 is arranged such that the first side 32 of the motor base 12 is proximal to the driven element. The lower portion 26 comprises a front 34, a back and two lateral sides 36 that extend vertically downward from the upper portion 24. The lower portion 26 further comprises a first base portion 38 and a second base portion 40. The first base portion 38 and the second base portion 40 extend downward from the two lateral sides 36 at an angle. However, the slope of the first base portion 38 is steeper than the slope of the second base portion 40 so that the first base portion 38 and the second base portion 40 converge to form an asymmetrical base 42 that is not positioned at the center of the motor base 12. Furthermore, the asymmetrical base 42 is arranged for receiving a shaft therein so that the motor base 12 will pivot freely about said shaft, as described below. In one embodiment, the asymmetrical base 42 is proximal to the first side 32 of the upper portion 24 of the motor base 12, as noted above.

The pivot base 14 comprises a support structure 44, a pivot shaft holder 46 and a pivot shaft 48. The support structure 44 comprises a rail member 50 having ends 52 and an upper surface 54. The rail member 50 is connected at each end 52 to a leg member 56. The leg members 56 comprise a vertical component 58 for attachment to the rail member 50 and a horizontal component 60 for attachment to the one-way restraining means 16 as described below. The pivot shaft holder 46 is arranged to accept the pivot shaft 48 therein. Of note is that there are two support structures 44 for supporting the pivot shaft holder 46 thereon. Assembled, the pivot shaft holder 46 is attached to the upper surface 54 of the rail members 50 of the two support structures 44. Next, the pivot shaft 48 is inserted into the pivot shaft holder 46 such that the pivot shaft 48 is fixed and will not rotate. Rather, the motor base 12 pivots around the pivot shaft 48 as described below.

Figure 3:
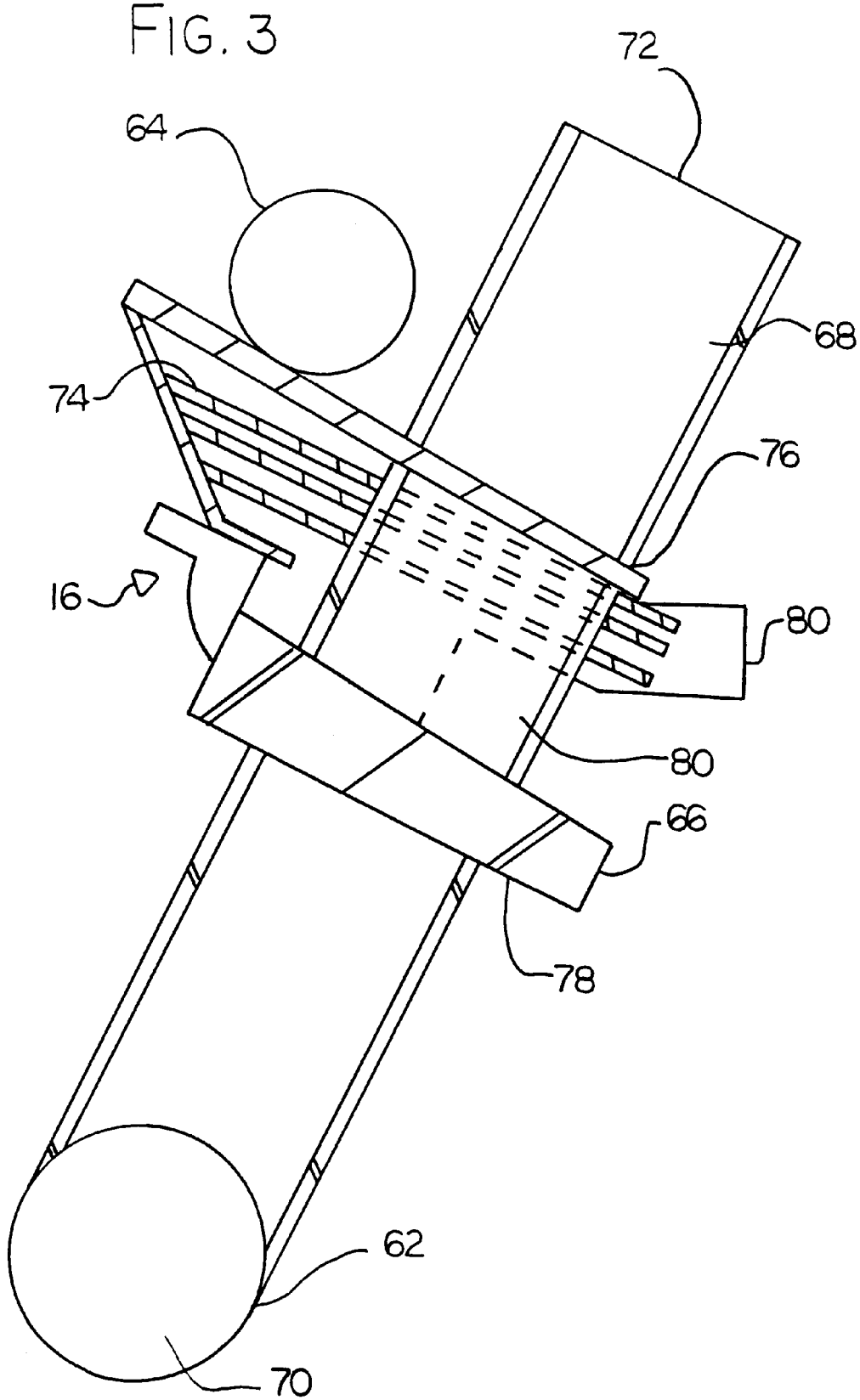
FIG. 3 is a cross-sectional view of the one-way restraining means.

The one-way restraining means 16 comprises a first pivot member 62, a second pivot member 64, a housing 66 and an elongate shaft member or way member 68, the details of which are shown in FIG. 3. The way member 68 comprises a base 70 and a top 72. Of note is that the surface of the way member 68 may be substantially smooth, rough or of a configuration designed specifically to interact with the housing 66 as desired. The housing 66 is arranged to be fitted over the top 72 of the way member 68. The housing 66 has a substantially planar upper surface 76 and a substantially planar lower surface 78. The housing 66 includes an open portion 80 situated on the housing 66 for accessing the way member 68. Located within the housing 66 are one or more friction engaging members or locking plate(s) 74 for engaging the way member 68. Specifically, the locking plate(s) 74 comprise opening(s) having an inner shape that is slightly greater than the shape of the way member 68. The locking plate(s) 74 are arranged within the housing 66 such that the locking plate(s) 74 are at an angle relative to the substantially planar upper surface 76 of the housing 66. In operation, the locking plate(s) 74 frictionally engage the way member 68 as described below. Additionally, the housing 66 includes a mechanism 82 for applying pressure on the locking plate(s) 74 so as to reposition the locking plate(s) 74 such that the locking plate(s) 74 are parallel with the substantially planar upper surface 76, as described below. Assembled, the housing 66 is fitted over the top 72 of the way member 68 while pressure is applied to the mechanism 82. Pressure to the mechanism 82 prevents the locking plate(s) 74 from engaging the way member 68 at this time. Once the housing 66 is at the desired position, the mechanism 82 is released and the locking plate(s) 74 reposition so as to be at an angle relative to the substantially planar upper surface 76 of the housing 66 and the way member 68. In this arrangement, the locking plate(s) 74 frictionally engage the way member 68. Of note is that the locking plate(s) 74 engage the way member 68 at an angle so that the housing 66 is only capable of movement along the way member 68 in one direction, that is, towards the top 72 of the way member 68. In order to move the housing 66 in the second direction, that is, towards the base 70 of the way member 68, pressure is applied to the mechanism 82, causing the locking plate(s) 74 to disengage the way member 68. Next, the first pivot member 62 is connected into the base 70 of the way member 68. As described below, the first pivot member 62 is involved in attaching the one-way restraining means 16 to the horizontal component 60 of the support structures 44 of the pivot base 14. The second pivot member 64 is connected to the substantially planar upper surface 76 of the housing 66. As described below, the second pivot member 64 is involved in attaching the one-way restraining means 16 to one of the connecting members 30 located on the first side 32 of the upper portion 24 of the motor base 12.

The motorized assembly apparatus 1 is assembled as follows. The asymmetrical base 42 of the lower portion 26 of the motor base 12 is fitted over the pivot shaft 48 of the pivot base 14. Thus, the motor base 12 is arranged to pivot about the pivot shaft 48. Next, the one-way restraining means 16 is connected to the motor base 12 and the pivot base 14. Specifically, the first pivot member 62 attached to the base 70 of the way member 68 is connected to the horizontal component 60 of one of the support structures 44 of the pivot base 14 and the second pivot member 64 is joined to one of the connecting members 30 of the upper portion 24 of the motor base 12. If required, this process is repeated for additional one-way restraining means 16 so that there are two or more one-way restraining means 16 connecting the pivot base 14 to the motor base 12. Furthermore, the one-way restraining means 16 are positioned as required along the first side 32 of the motor base 12. As noted above, the housing 66 of the one-way restraining means 16 is capable of movement along the way member 68 in only one direction, that is, towards the top 72 of the way member 68. As a consequence of this arrangement, the motor base 12 pivots in one direction only. Next, the motor 10 is placed on the motor base 12 and the belt drive 18 connected to the driven element is fitted around the pulley 22 of the motor 10. The motor body 20 is positioned on the motor base 12 such that the weight of the motor body 20 rests substantially away from the first side 32 of the motor base 12. As a result, the motor base 12 will tend to pivot away from the first side 32 of the motor base 12. Of note is that while pivoting away from the first side 32, that is, away from the driven element, is not prevented by the one-way restraining means 16, the motorized assembly apparatus 1 is arranged such that pivoting of the motor body 20 in this direction is resisted by the belt(s) 18 connected to the pulley 22, as described below.

In operation, the motor 10 drives rotation of the pulley 22 about its axis. This is in turn drives the belt(s) 18 connected to the driven element. Over time, the belt(s) 18 will tend to stretch and loosen around the pulley 22. As a result, the weight of the motor body 20 causes the motor base 12 to pivot away from the driven element until the belt drive is again taut. As the motor base 12 pivots, the housing 66 moves upwards along the way member 68 of the one-way restraining means 16 toward the top 72 of the way member 68. As the locking plate(s) 74 frictionally engage the way member 68 at an angle, the housing 66 is prevented from moving down the way member 68, and hence the motor base 12 is prevented from pivoting back towards the driven element. As a result, the belt drive will remain taut, thereby improving motor efficiency and reducing vibration. In order to replace or service the belt(s) 18, pressure is applied to the mechanism 82 on the one-way restraining means 16 to disengage the locking plate(s) 74 from the way member 68, as described above. This in turn allows the housing 66 to be moved down the way member 68 so that the motor base 12 pivots towards the driven element, thereby loosening the belt(s) 18 so that the belt(s) 18 may be removed or replaced.

Figure 4:
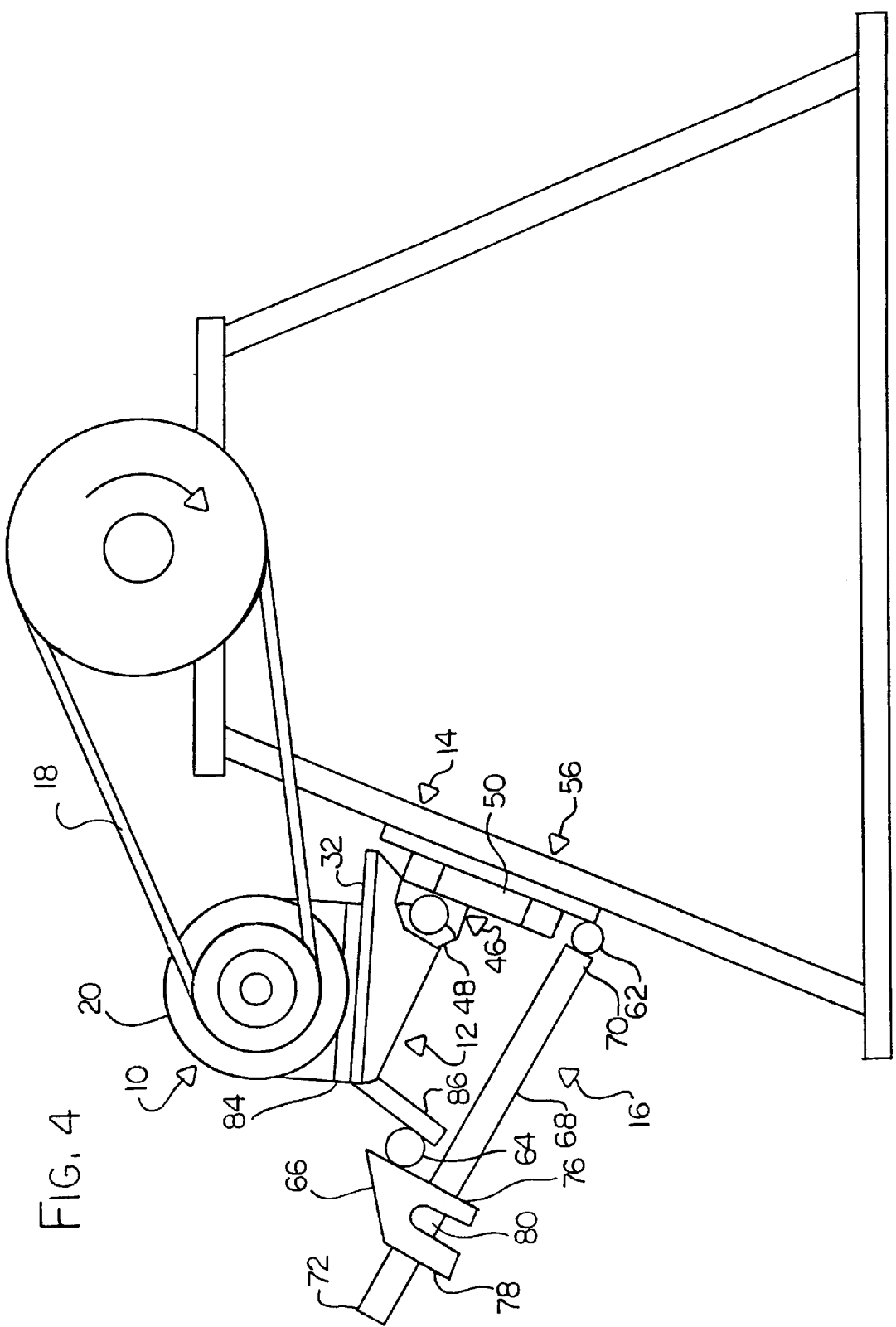
FIG. 4 is a front view of an alternative arrangement of the apparatus.

An alternative arrangement of the motorized assembly apparatus is shown in FIG. 4 wherein the motor base 12 further comprises a second side 84 and the second side includes connecting members 86 for connecting the second side 84 of the motor base 12 to the one-way restraining means 16 as described below. In this arrangement, the one-way restraining means 16 are connected to the pivot base 14 such that the one-way restraining means 16 are positioned proximal to the second side 84 of the motor base 12. Specifically, the first pivot member 62 attached to the base 70 of the way member 68 is connected to the horizontal component 60 of one of the support structures 44 of the pivot base 14 and the second pivot member 64 is attached to one of the connecting members 86 of the second side 84 of the motor base 12. The process is repeated for additional one-way restraining means 16 so that there are two or more one-way restraining means 16 connecting the pivot base 14 to the motor base 12. Furthermore, the one-way restraining means 16 is arranged such that the housing 66 moves along the way member 68 toward the base 70 of the way member 68. In operation, the weight of the motor body 20 causes the motor base 12 to pivot away from the driven element as the belt(s) 18 loosen, as described above. As the motor base 12 pivots, the housing 66 moves along the way member 68 of the one-way restraining means 16 toward the base 70. As noted above, the locking plate(s) 74 frictionally engage the way member at an angle, which prevents the housing 66 from moving toward the top 72 of the way member 68. Thus, in this arrangement, the one-way restraining means 16 are connected to the portion of the motor base 12 supporting the weight of the motor body 20. In one embodiment of this arrangement, the pivot base 14 may be located to the side of the motor base 12 as shown in FIG. 4, although this is not an essential feature of this arrangement and should be interpreted as illustrative only.

Alternatively, the mounting and pivoting assemblies may be combined into a single plate mount arrangement that embodies all of the spirit and scope of the claims.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. Apparatus comprising:

a motor having a drive pulley thereon;

a driven element having a driven pulley thereon;

a belt drive connecting the drive pulley and the driven pulley;

a motor base on which the motor is mounted for support thereby;

a pivot support base on which the motor base is mounted for pivotal movement relative thereto about a pivot shaft in a belt tensioning direction and in an opposite belt slackening direction;

pivot biasing means for promoting pivoting of the motor base in the belt tensioning direction; and one-way restraining means connecting the motor base and the pivot support base;

the restraining means including an elongate shaft member connected to one of the motor base and the pivot support base at a position thereon spaced away from and separate from the pivot shaft and a friction engaging member connected to the other of the motor base and the pivot support base and slidable along a generally smooth outer surface of the elongate shaft member;

the friction engaging member being freely slidable on the elongate shaft member in a first direction to allow free movement in the belt tightening direction;

and the friction engaging member being held by frictional engagement with the generally smooth outer surface of the elongate shaft member against movement in a second direction opposite to the first direction such that the one-way restraining means prevents the motor base from pivoting in the slackening direction.

\* \* \* \* \*